UNITED STATES PATENT OFFICE.

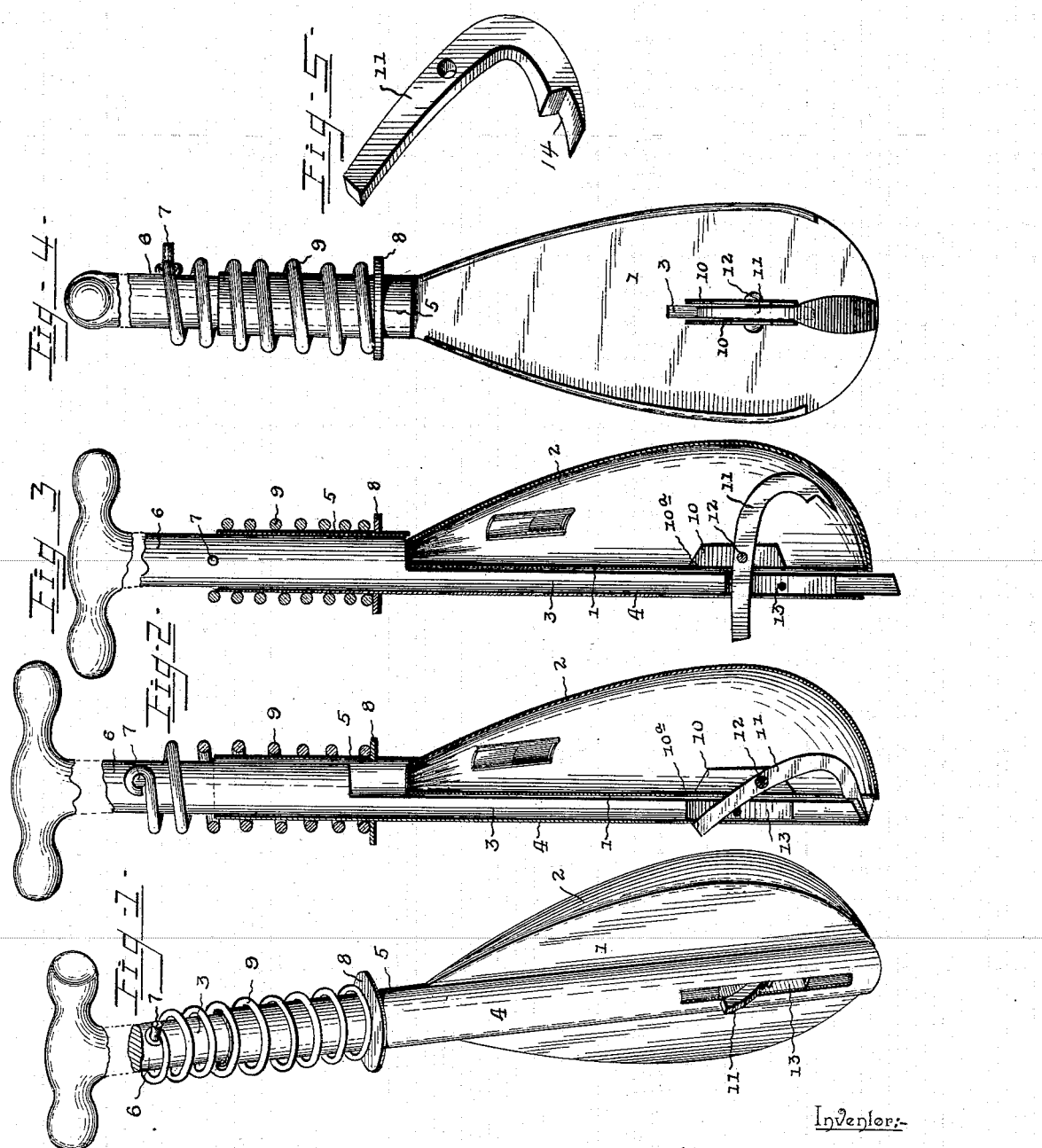

TIMOTHY B. PERRY, OF WEST, TEXAS, ASSIGNOR OF ONE-HALF TO
W. R. DENTON, OF SAME PLACE.

HAND-PLANTER.

SPECIFICATION forming part of Letters Patent No. 612,270, dated October 11, 1898.

Application filed December 31, 1897. Serial No. 664,953. (No model.)

*To all whom it may concern:*

Be it known that I, TIMOTHY B. PERRY, a citizen of the United States, residing at West, in the county of McLennan and State of Texas, have invented a new and useful Hand-Planter, of which the following is a specification.

This invention relates to improvements in hand-planters especially designed for replanting cotton-seed in rows in the event of the seed originally planted failing to germinate and grow; and the object that I have in view is to provide a simple and inexpensive construction which may be easily operated by the man walking alongside the row or one riding on a cultivator in the operation of cultivating the growing plants.

A further object that I have in view is to provide a mechanism by which the seed is forced or carried in a positive manner into the path of a plunger and to so construct and arrange the elements that the feed mechanism will be controlled automatically by the endwise adjustment or movement of the plunger.

With these ends in view the invention consists in the combination, with a hopper and spring-controlled plunger slidably fitted thereto and arranged to project beyond the lower end of said hopper to force the seed into the ground, of a feeder-bar mounted within the hopper and connected operatively with the plunger to be moved positively thereby as the plunger is raised and lowered and adapted to deposit seed in the path of said plunger to be carried therewith into the ground when the plunger is depressed, said feeder-bar being automatically retracted out of the path of the plunger on the downstroke thereof.

The invention further consists in the novel combination and arrangement of parts, which will be hereinafter fully described and claimed.

To enable others to understand my invention, I have illustrated the preferred embodiment thereof in the accompanying drawings, forming a part of this specification, and in which—

Figure 1 is a perspective view of a hand-planter constructed in accordance with my invention. Fig. 2 is a vertical sectional elevation taken centrally through the planter and illustrating the position of the feeder-bar when the plunger is elevated by the action of the lifting-spring. Fig. 3 is a similar sectional elevation illustrating the positions of the parts when the plunger is depressed. Fig. 4 is a detail view of the main or face plate forming one part of the hopper. Fig. 5 is a detail perspective view of the feeder-bar detached from the main face-plate and the plunger.

Like numerals of reference denote like and corresponding parts in each of the several figures of the drawings.

1 designates the main face-plate of my improved hand-planter, and 2 is the hopper, which is applied to one side of the face-plate in a suitable manner. The face-plate serves to carry and guide the endwise-movable plunger 3, and it is provided with a longitudinal guide 4 to receive and direct the plunger in its endwise or reciprocating movement. The longitudinal guide 4 is preferably of curved or semicircular form and arranged on the outside or exposed face of the main plate 1, and this longitudinal guide extends from the top to the bottom end of said main face-plate for the purpose of having its lower end open through the lower extremity or foot of the planter, and thereby permit the lower extremity of the plunger to project beyond the hopper and face-plate when the plunger is depressed by applying force to the upper end thereof. This longitudinal guide 4 on the face-plate opens into or communicates with a vertical thimble 5, which is provided on the upper end of the face-plate 1, and this thimble 5 may be integral with the face-plate or it may be made separate therefrom and attached rigidly to said plate in a manner to form a continuation of the guide 4.

The plunger 3 of my improved planter is provided on one side with a flat face, while its other side is rounded or made convex for the purpose of enabling the plunger to fit snugly against the face-plate and within the guide 4, thus insuring the proper endwise movement to the plunger and preventing it from turning or rotating axially within the guide on the face-plate. The upper part of the plunger is of substantially cylindrical form to provide the rod or staff 6, which extends through the cylindrical thimble 5 and projects a suitable distance above the hopper for the purpose of enabling the operator to grasp the staff. If desired, the upper extremity of the staff may be formed with a suitable handle by which the implement may be carried conveniently and operated with ease.

The plunger is normally raised to have its lower extremity or foot lie a short distance above the lower open end of the guide 4 by means of a coiled spring 9, which encircles the staff of the plunger and the cylindrical thimble 5 on the face-plate, and one end of this spring 9 is seated against an annular rib or flange 8, rigid with the cylindrical thimble 5, while the other end thereof bears against the stop pin or stud 7, which is attached rigidly to the cylindrical plunger-staff at a point above the upper extremity of the thimble 5. The tension of this spring is normally exerted against the pin or stud 7 to lift the plunger and its staff to the required position; but when pressure is applied in a downward direction on the staff the spring is compressed sufficiently to permit the plunger to move endwise in the guide 4 and have its foot or lower extremity project beyond said guide and the hopper for the purpose of forcing the plunger-foot and the seed beneath the same into the ground.

The hopper 2 is preferably of the elongated tapered form shown by the drawings, and it is attached to the face-plate 1 in any desired way—as, for instance, by providing interlocking flanges on the edges of the face-plate and the hopper—but the detailed construction of the hopper, its shape, and the means for attaching the hopper and face-plate together are immaterial and may be varied at pleasure.

If desired, a suitable filling-opening may be provided in the hopper for the purpose of depositing seed therein without detaching the hopper from the face-plate, and in this event the filling-opening is designed to be closed by a suitable door or slide movably attached to the hopper.

On the inner face or side of the main face-plate 1 of the planter I provide a pair of parallel lugs 10, which may be integral with the face-plate or be made separate therefrom and secured to the same in any desired way. These lugs 10 are rigid with the face-plate on opposite sides of a slot $10^a$, provided in said face-plate within the limits of the longitudinal guide 4, and between the lugs and in the slot $10^a$ of the face-plate is fitted the feeder-bar 11. This feeder-bar may consist of a single casting of the form shown substantially by Fig. 5 of the drawings, or said feeder-bar may be made of wood or other suitable material. The feeder-bar consists of a substantially straight shank and a curved broad head, and said feeder-bar is fitted between the lugs 10 in a manner to receive at an intermediate point of its length the pivot 12, which is attached to said lugs 10 and serves to pivotally support the feeder-bar within the hopper and on the face-plate in proper relation to the reciprocating plunger 3. The front end of the shank of said feeder-bar passes through the slot $10^a$ in the face-plate and projects into a slot 13, provided in the plunger 3, at a point intermediate of the length of the latter, and by thus arranging said feeder-bar in the slot of the plunger said feeder-bar is operatively connected with the plunger to be moved thereby as it is reciprocated longitudinally within the guide 4 on the face-plate. The broad curved head of the feeder-bar is adapted to project below the foot of the plunger when the latter is raised by the action of the coiled spring thereon, and said head is provided at its free extremity with a transverse notch, forming a pocket 14, adapted to receive the seed from the hopper and to carry the same into position below the plunger.

In the initial position the spring lifts the plunger to bring its foot above the lower open end of the guide 4, and the feeder-bar is moved to present its notched head below the foot of the plunger for the purpose of holding seed in the path of said plunger. When the operator desires to plant seed in a hill or row, the implement is placed on the ground at the desired point and pressure is applied to the plunger-staff sufficient to overcome the tension of the spring and depress the plunger to move the latter endwise through the guide 4. As the plunger descends its foot projects beyond the face-plate and hopper, and the seed below said foot is carried down with the plunger and thereby planted in the ground at the desired depth. During the descent of the plunger the spring is compressed and the feeder-bar is moved in an upward and rearward direction into the hopper and out of the path of the foot of the plunger, thus retracting the head of the feeder-bar out of the way of the plunger and forcing its pocketed end into the seed contained within the hopper; but when pressure is removed from the plunger-staff and the spring reacts to lift the plunger the feeder-bar is moved or turned on its pivot to force its notched head and the seed in the pocket thereof into the path of the foot of the plunger, thereby placing a fresh supply of seed in the path of the plunger to be carried therewith into the ground on the next operation of planting.

It will be observed that the broad notched head of the feeder-bar occupies a position across the foot of the plunger when the latter is raised or retracted within the case or hopper of the planter, and that said notched or pocketed head of the feeder-bar serves to confine or hold the seed between itself and the plunger-foot. This construction and arrangement of parts possesses utility in that the seed is prevented from being lost while the implement is carried by the hand from place to place, but the feeder-bar does not interfere with the operation of planting, because it is controlled by the movement of the plunger in a manner to be retracted automatically from the path of the plunger when the latter is depressed.

My improved implement is simple and durable in construction, efficient and automatic in operation, and can be used conveniently by an attendant riding on a cultivator or walking alongside of the row of growing plants. The parts are few in number and not liable to get out of order, thus promoting the efficiency and durability of the implement.

It is evident that changes in the form and proportion of parts and in the details of construction may be made without departing from the spirit or sacrificing the advantages of the invention; and I therefore reserve the right to make such changes and alterations as properly fall within the scope of the invention.

While I have especially described my implement as adapted for use in replanting cotton-seed, I do not desire to strictly confine myself to this special adaptation of the implement, because it is evident that it may be used for planting corn or other grain.

Having thus described the invention, what I claim as new, and desire to secure by Letters Patent, is—

1. In a hand-planter, the combination with a hopper, and a reciprocating plunger, of a feeder-bar separate from the plunger and pivotally supported within the hopper, one end of said feeder-bar being connected with said plunger and its other end adapted to be thrown into and out of the path of said plunger by the movement thereof, substantially as described.

2. In a hand-planter, the combination with a hopper, and a reciprocating plunger, of a feeder-bar pivoted within the hopper and operatively connected with the plunger to be retracted thereby on its downstroke and to be thrown into the path of said plunger when it is raised, substantially as and for the purposes described.

3. In a hand-planter, the combination with a hopper, of a spring-controlled plunger guided therein and provided with a longitudinal slot, and a feeder-bar pivoted within the hopper and having one end fitted in the slot of the plunger and provided with an enlarged notched head at its other extremity, said feeder-bar arranged to be held by the plunger to have its broad notched head lie in the path of the plunger when the latter is raised, substantially as and for the purposes described.

4. In a hand-planter, the combination of a face-plate provided with a longitudinal guide and a cylindrical thimble, a hopper attached to said face-plate, a plunger fitted in the guide and the thimble, a coil-spring seated against the thimble and a projection on the plunger-staff to normally raise the latter, and a feeder-bar pivoted to the face-plate within the hopper and having one end thereof operatively connected with the plunger, substantially as and for the purposes described.

5. In a hand-planter, a face-plate provided with parallel lugs or flanges disposed on opposite sides of the slot therein and with a longitudinal guide which communicates with a cylindrical thimble, in combination with a plunger fitted in said longitudinal guide and having its staff working in the thimble, a hopper fixed to the face-plate, and a feeder-bar pivoted at an intermediate point of its length in said lugs or flanges and having one end thereof fitted in a slot of the plunger, the free end of said feeder-bar being provided with an enlarged notched head adapted to be thrown into the path of the foot of the plunger, substantially as and for the purposes described.

In testimony that I claim the foregoing as my own I have hereto affixed my signature in the presence of two witnesses.

TIMOTHY B. PERRY.

Witnesses:
W. R. DENTON,
T. M. WEST.